United States Patent
Sheridan et al.

(10) Patent No.: US 6,878,845 B2
(45) Date of Patent: Apr. 12, 2005

(54) OLIGOMERS FROM MULTIFUNCTIONAL ACRYLATES

(75) Inventors: Matthew S. Sheridan, Powell, OH (US); Laurence G. Dammann, Powell, OH (US); Sridevi Narayan-Sarathy, Hilliard, OH (US)

(73) Assignee: Ashland Inc., Ashland, KY (US)

( * ) Notice: Subject to any disclaimer, the term of this patent is extended or adjusted under 35 U.S.C. 154(b) by 28 days.

(21) Appl. No.: 10/269,947

(22) Filed: Oct. 15, 2002

(65) Prior Publication Data

US 2004/0072979 A1 Apr. 15, 2004

(51) Int. Cl.[7] .............................................. C07C 69/72
(52) U.S. Cl. ..................... 560/178; 560/183; 560/205; 560/92; 560/16; 560/54; 560/146; 560/153
(58) Field of Search ................................ 560/178, 183, 560/205, 92, 16, 54, 146, 153; 525/471, 539; 528/220; 526/312, 328, 229

(56) References Cited

U.S. PATENT DOCUMENTS

| | | | | |
|---|---|---|---|---|
| 4,338,239 A | * | 7/1982 | Dammann | 524/549 |
| 5,945,489 A | * | 8/1999 | Moy et al. | 525/471 |
| 6,025,410 A | * | 2/2000 | Moy et al. | 522/182 |
| 6,673,851 B2 | * | 1/2004 | Moy et al. | 522/173 |
| 6,706,414 B1 | * | 3/2004 | Dammann et al. | 428/524 |
| 2003/0073757 A1 | * | 4/2003 | Moy et al. | 522/176 |
| 2004/0063030 A1 | * | 4/2004 | Barr et al. | 430/270.1 |

OTHER PUBLICATIONS

Bunce, R et al "Michael Addition of Nitromethane with —disubstituted Acrylate Esters", Organic Preparations and Procedures International, V.19, No. 6, pp. 471–475, 1987.*

Organic Chemistry by John McMurry(Brooks Cole Publishing Co), 1988, p. 841.*

* cited by examiner

Primary Examiner—Tatyana Zalukaeva
(74) Attorney, Agent, or Firm—Connolly Bove Lodge & Hutz LLP

(57) ABSTRACT

Oligomers from multifunctional acrylates and organonitro compounds are provided. Films obtained from crosslinked oligomers of the present invention are useful as protective or decorative coatings as well as components in adhesives and composites.

21 Claims, No Drawings

OLIGOMERS FROM MULTIFUNCTIONAL ACRYLATES

DESCRIPTION

1. Technical Field

The present invention relates to multifunctional acrylate compositions. More particularly, the present invention relates to liquid oligomeric multifunctional acrylate compositions having nitro groups bound as part of the polymer structure. The compositions of the present invention cure upon exposure to active radiation such as UV light. Films made from the crosslinked oligomers of the invention are useful as protective or decorative coatings on various substrates. The oligomers can also be used in adhesives and composites.

2. Background of Invention

Multifunctional acrylates, methacrylate and other unsaturated monomers are widely used in coatings, adhesives, sealants, elastomers, crosslinked films, foundry sand binders and composite structures. These monomers may be crosslinked by free radical chain mechanism, which may require any of a number of free radical generating species such as peroxides, hydroperoxides or azo compounds, for example, which may decompose to form radicals when heated, or at ambient temperature in the presence of amines or transition metal promoters.

Another means of initiating reaction, currently not as widespread but gaining in popularity, is the use of UV radiation to decompose photoinitiators to free radicals. This method offers extremely rapid processing potential for a number of applications, as the transformation from a liquid reactive composition to a crosslinked solid is essentially instantaneous upon exposure to UV radiation. Electron beam radiation can also be used to affect cure.

Various problems associated with acrylates have been addressed in U.S. Pat. Nos. 5,945,489 and 6,025,410 to Moy et al and assigned to Ashland, Inc., the assignee of the present application. Such approach involves reacting multifunctional acrylates with acetoacetates via Michael Addition in ratios, which yield uncrosslinked, acrylate-functional resins. These resins cross-link upon exposure to an appropriate UV source in the absence of added photoinitiators. There are advantages to this technology in terms of low volatility and toxicity.

A number of widely used multifunctional acrylate oligomers are available commercially and are typically based on esterification of glycols, polyols or epoxy resins with acrylic acid. These processes may require temperatures of sufficient magnitude to initiate undesired polymerization and crosslinking of the acrylate groups and provisions for the removal of low molecular weight by-products, e.g., water or alcohols. In addition, functionalization of a molecule tends to become more difficult if higher molecular weights and/or higher functionalities are desired. This may be desirable in particular for some adhesive and coating applications.

Accordingly considerable room still exists for improvement with respect to multifunctional acrylates.

SUMMARY OF INVENTION

The present invention relates to providing acrylate oligomers of increased molecular weight. In particular, the present invention makes it possible to provide liquid, uncrosslinked oligomers that can be further reacted to form crosslinked structures.

According to the present invention, this can be achieved without requiring external heating and without producing volatile low molecular weight by-products that require removal as the reaction proceeds.

More specifically, the present invention relates to a new uncrosslinked liquid oligomeric composition, comprising a Michael Addition reaction product of a multifunctional acrylate and an organonitro reactant.

The present invention also relates to curing the above disclosed uncrosslinked liquid oligomeric compositions by exposing the compositions to actinic light.

The present invention also relates to a cured product obtained by subjecting the above-disclosed liquid oligomeric composition to actinic light such as UV radiation.

Another aspect of the present invention relates to a method, which comprises applying the above-disclosed liquid oligomeric composition to a substrate and then exposing the composition to actinic light.

A still further aspect of the present invention relates to the product obtained by the above-disclosed method.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

Among the multifunctional acrylates used in making the oligomers of the present invention are diacrylates, triacrylates, and tetraacrylates. Examples of multifunctional acrylates are diethylene glycol diacrylate, ethoxylated bisphenol A diacrylate, 1,6 hexanediol diacrylate, neopentyl glycol diacrylate, polyethylene glycol diacrylate, propoxylated neopentyl glycol diacrylate, tetraethylene glycol diacrylate, triethylene glycol diacrylate, tripropylene glycol diacrylate, trimethylolpropane triacrylate, ethoxylated trimethylolpropane triacrylate, propoxylated glyceryl triacrylate, tris (2-hydroxyethyl) isocyanurate triacrylate, pentaerythritol triacrylate and pentaerythritol tetraacrylate. Acrylated Epoxy resins, acrylated Urethanes, acrylated polyesters and other like acrylated materials are also suitable reactants.

Examples of suitable organonitro compounds are the nitro substituted alkanes and more typically mononitro substituted alkanes that typically have 1–18 carbon atoms and more typically 1–4-carbon atoms. Other suitable nitro compounds include functionalized nitro compounds such as 2-nitroethanol.

According to the present invention, the multifunctional acrylate is typically employed in excess of its stoichiometric amount. Typically the equivalent ratio of the multifunctional acrylate to the organonitro compound is greater than 1, more preferably greater than 1.1:1.

The Michael Addition reactions can be catalyzed by a strong base, such as diazabicycloundecene (DBU) which is sufficiently strong and readily soluble in the monomer mixtures. Other cyclic amidines, for example diazabicyclononene (DBN) and guanidines are also suitable for catalyzing this reaction. In addition, quarternary ammonium hydroxides such as tetrabutyl ammonium hydroxide and alkali metal alkoxide such as potassium t-butoxide are useful catalysts. Also potassium hydroxide, sodium hydroxide or lithium hydroxide can be used as a catalyst.

The Michael Addition reaction employed according to the present invention does not require heating to "link together" existing multifunctional acrylates to produce higher molecular weight acrylate oligomers and does not evolve volatile byproducts which require removal from the reaction. Each acrylate group has a functionality of one under conditions of the Michael Addition. The functionality of the nitroorganic coreactant is either 2 or 3. Under the selected conditions of acrylate functionality and its stoichiometry with respect to the Organonitro coreactant, uncrosslinked multifunctional acrylate oligomers may be obtained.

Typically, the above oligomers of the present invention are not self-photoinitiating by exposure to UV radiation, and need an additional photoinitiator for cross-linking. However, the above oligomers of the present invention can be made self-photoinitiating by co-reacting with a relatively minor amount of an acetoacetate (such as about 2.5 to 10 wt %), an example being about 3%. In addition, the nitro group is known to be photosensitizing in the 300–400 nanometer range. Suitable acetoacetates can be found in U.S. Pat. No. 5,954,489, disclosure of which is incorporated herein by reference.

The rate of curing can be enhanced by the addition of suitable photosensitizers and photoinitiators. Examples of photoinitiators are 1-hydroxycyclohexyl phenyl ketone, 2-benzyl-2-N,N-dimethylamino-1-(4-morpholinophenyl)-1-butanone, 2,2-dimethoxy-2-phenyl acetophenone, and 2-hydroxy-2-methyl-1-phenyl-propane-1-one. Illustrative of suitable photosensitizer compounds one can mention acetophenone, propiophenone, benzophenone, xanthone, fluorenone, benzaldehyde, fluorene, anthroquinone, triphenylamine, carbazole, 3- or 4-methylacetophenone, 3- or 4-pentylacetophenone, 3- or 4-chlorobenzophenone, 3-chloroxanthone, 3-methoxyxanthone and the like. The amount of photoinitiator or photosensitizer used can vary from about 0.01 to about 20 weight percent of the coating solution. A preferred amount is about 0.5 to about 3 weight percent. A mixture of photoinitiators and/or photosensitizers can also be used.

The liquid oligomer compositions of the present invention, since they are liquids, can readily be applied to various substrates using coating techniques such as roll or spray prior to the actinic light cure.

The following scheme showing Michael Addition of a selected organonitro compound and multifunctional diacrylate is for purposes of illustration only and to facilitate a further understanding of the present invention.

Michael Addition of Nitroethane to 1,6-Hexanediol Diacrylate

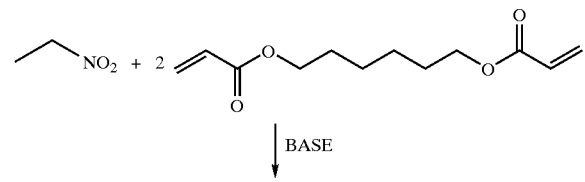

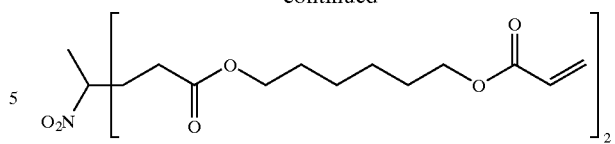

The following non-limiting examples are presented to further illustrate the present invention. In the following examples, all parts are by weight unless otherwise indicated. In addition, all references mentioned herein are specifically incorporated by reference.

EXAMPLE 1

Michael Addition Product of Nitromethane and 1,6-Hexanediol Diacrylate

A resin is prepared by the DBU (1,8-diazabicyclo [5.4.0] undec-7-ene) catalyzed Michael addition of 3.0 g (0.05 mole) Nitromethane to 44.3 g (0.20 mole) 1,6-Hexanediol diacrylate. NMR indicates that the position alpha to the Nitro functionality has become fully substituted. There is no evidence for any unreacted Nitromethane. Molecular weight determination by GPC supports these findings. A sample containing 3% (w/w) of Irgacure 1700 photoinitiator crosslinks to form a soft tack free film after two 500 mJ/cm$^2$ exposures to a Fusion "H" bulb.

EXAMPLE 2

Michael Addition Product of Nitromethane and Trimethylolpropane Triacrylate

A resin is prepared by the DBU (1,8-diazabicyclo [5.4.0] undec-7-ene) catalyzed Michael Addition of 2.0 g (0.033 mole) Nitromethane to 58.6 g (0.20 mole) Trimethylolpropane triacrylate. NMR indicates that the position alpha to the Nitro functionality has become fully substituted. There is no evidence for any unreacted Nitromethane. Molecular weight determination by GPC supports these findings. A sample containing 3% (w/w) of Irgacure 1700 photoinitiator crosslinks to form a tack free film after one 500 mJ/cm$^2$ exposure to a Fusion "H" bulb.

EXAMPLE 3

Michael Addition Product of Nitroethane and Trimethylolpropane Triacrylate

A resin is prepared by the DBU (1,8-diazabicyclo [5.4.0] undec-7-ene) catalyzed Michael Addition of 5.0 g (0.067 mole) Nitroethane to 58.6 g (0.20 mole) Trimethylolpropane triacrylate. NMR indicates that the position alpha to the Nitro functionality has become fully substituted. There is no evidence for any unreacted Nitroethane. Molecular weight determination by GPC supports these findings. A sample containing 3% (w/w) of Irgacure 1700 photoinitiator crosslinks to form a tough tack free film after one 500 mJ/cm$^2$ exposure to a Fusion "H" bulb.

In all three examples, NMR confirmed complete reaction of the active methylene group in the position alpha to the Nitro functionality. GPC confirmed a molecular weight increase relative to the parent acrylate and branching that is what is expected in each system. UV radiation cure experiments indicated comparable reactivity with the parent acrylate.

EXAMPLE 4

Michael Addition Product of 50/50 Nitroethane/Ethylacetoacetate and Trimethylolpropane Triacrylate A resin was prepared by the DBU (1,8-diazabicyclo [5.4.0] undec-7-ene) catalyzed Michael addition of 2.5 g (0.033 mole) Nitroethane and 4.35 g of Ethylacetoacetate (0.033 mole) to 43.5 g (0.15 mole) Trimethylolpropane triacrylate. NMR indicates that the position alpha to the Nitro functionality has become fully substituted. There is no evidence for any unreacted Nitroethane. Also there is 100% conversion of EAA to the disubstituted project. The liquid Oligomer crosslinks to form a tough tack free film with very good solvent resistance, after one 500 mJ/cm$^2$ exposure to a Fusion "H" bulb without added photoinitiator.

EXAMPLE 5

Michael Addition Product of 75/25 Nitroethane/ Ethylacetoacetate and Trimethylolpropane Triacrylate A resin was prepared by the DBU (1,8-diazabicyclo [5.4.0] undec-7-ene) catalyzed Michael addition of 5 g (0.067 mole) Nitroethane and 2.9 g of Ethylacetoacetate (0.022 mole) to 57.9 g (0.195 mole) Trimethylolpropane triacrylate. NMR indicates that the position alpha to the Nitro functionality has become fully substituted. There is no evidence for any unreacted Nitroethane. Also there is 100% conversion of EAA to the disubstituted product. The liquid oligomer crosslinks without added photoinitiator to form a tough tack free film with very good solvent resistance, after two 500 mJ/cm$^2$ exposures to a Fusion "H" bulb

EXAMPLE 6

Michael Addition Product of 85/15 Nitroethane/ Ethylacetoacetate and Trimethylolpropane Triacrylate A resin was prepared by the DBU (1,8-diazabicyclo [5.4.0] undec-7-ene) catalyzed Michael addition of 5 g (0.067 mole) Nitroethane and 1.53 g of Ethylacetoacetate (0.012 mole) to 51.1 g (0.172 mole) Trimethylolpropane triacrylate. NMR indicates that the position alpha to the Nitro functionality has become fully substituted. There is no evidence for any unreacted Nitroethane. Also there is 81% conversion of EAA to the disubstituted product. The liquid Oligomer crosslinks to form a glossy tack free film with good solvent resistance, after six 500 mJ/cm$^2$ exposures to a Fusion "H" bulb. It is to be noted that the Nitro resin without the Ethylacetoacetate does not cross-link at all under these conditions without added photoinitiator.

EXAMPLE 7

Trifunctional Acrylate from Nitromethane and Hexanadiol Diacrylate and its Michael Reaction Product with Ethylacetoacetate A trifunctional acrylate was prepared by the DBU (1,8-diazabicyclo [5.4.0] undec-7-ene) catalyzed Michael addition of 20 g (0.327 mole) Nitroethane to 244.8 g (1.08 mole) Trimethylolpropane triacrylate. The dark green solution was further reacted with 25.4 g (0.195 mole) of Ethylacetoacetate in presence of more DBU. NMR indicates that the position alpha to the Nitro functionality has become fully substituted. There is no evidence for any unreacted Nitroethane. Also there is 100% conversion of EAA to the disubstituted product. The reddish brown liquid Oligomer crosslinks without added photoinitiator to form a glossy tack free film with very good solvent resistance, after three 500 mJ/cm$^2$ exposures to a Fusion "H" bulb. The film has unusually good impact properties with a forward impact of about 150 lb./in and a reverse impact of 50 lb/in.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed:

1. A Michael addition reaction product of a multifunctional acrylate and organonitro compound.

2. The reaction product of claim 1, wherein the organonitro compound is a functionalized nitro compound.

3. The reaction product of claim 1, wherein the organonitro compound is a nitroalkane.

4. The reaction product of claim 3, wherein the nitroalkane has 1 to 18 carbon atoms.

5. The reaction product of claim 3, wherein the nitroalkane has 1–4 carbon atoms.

6. The reaction product of claim 3, wherein the nitroalkane comprises nitromethane or nitroethane.

7. The reaction product of claim 1, wherein the multifunctional acrylate is a diacrylate, triacrylate or tetraacrylate.

8. The reaction product of claim 1, wherein the multifunctional acrylate is selected from the group consisting of diethylene glycol diacrylate, ethoxylated bisphenol A diacrylate, 1,6-hexanediol diacrylate, neopentyl glycol diacrylate, polyethylene glycol diacrylate, propoxylated neopentyl glycol diacrylate, tetraethylene glycol diacrylate, triethylene glycol diacrylate, tripropylene glycol diacrylate, trimethylolpropane triacrylate, ethoxylated trimethylolpropane triacrylate, propoxylated glyceryl triacrylate, tris(2-hydroxyethyl) isocyanurate triacrylate, pentaerythritol triacrylate, pentaerythritol tetraacrylate, acrylated epoxy resins, urethane acrylates and acrylated polyesters.

9. The reaction product of claim 1, wherein the acrylate comprises hexanediol diacrylate or trimethylol propane triacrylate.

10. The reaction product of claim 5, wherein the acrylate comprises hexanediol diacrylate or trimethylol propane triacrylate.

11. The reaction of claim 1, wherein the multifunctional acrylate is employed in excess of its stoichiometric amount and the product is a non-crosslinked liquid oligomer.

12. The reaction of claim 1, wherein the equivalent ratio of the multifunctional acrylate to organonitro compound is greater than 1.

13. A method for producing the reaction product of claim 1, which comprises of reacting the acrylate and nitroorganic compound in the presence of a strong base catalyst.

14. The method of claim 13, wherein the base is a cyclic amidine, quarternary amine hydroxides or alkali metal alkoxides or hydroxides.

15. The method of claim 13, wherein the base comprises DBU, DBN or a guanidine.

16. The reaction product of claim 1, wherein further includes an acetoacetate.

17. The reaction product of claim 16, wherein the amount of acetoacetate is about 2 to about 20 wt. %.

18. A photo-curable composition comprising the reaction product of claim 1 and a photoinitiator.

19. A method for producing a coated substrate which comprises applying the reaction product of claim 1 to a substrate and curing the reaction product.

20. A method for producing a coated substrate which comprises applying the composition of claim 18 and curing the composition.

21. The method of claim 20 which comprises curing the composition by UV radiation.

* * * * *